United States Patent
Cho et al.

(10) Patent No.: US 8,665,808 B2
(45) Date of Patent: Mar. 4, 2014

(54) METHOD OF CONVERTING ALLOCATED RADIO RESOURCE MODE OF MS IN WIRELESS ACCESS SYSTEM

(75) Inventors: Hee Jeong Cho, Anyang-si (KR); Ki Seon Ryu, Anyang-si (KR); Jae Won Lim, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 12/738,477

(22) PCT Filed: Oct. 14, 2008

(86) PCT No.: PCT/KR2008/006037
§ 371 (c)(1),
(2), (4) Date: Apr. 16, 2010

(87) PCT Pub. No.: WO2009/051382
PCT Pub. Date: Apr. 23, 2009

(65) Prior Publication Data
US 2010/0215012 A1 Aug. 26, 2010

(30) Foreign Application Priority Data
Oct. 18, 2007 (KR) .................. 10-2007-0105225

(51) Int. Cl.
*G01R 31/08* (2006.01)
(52) U.S. Cl.
USPC ........... 370/329; 370/332; 370/341; 455/450; 455/456.2
(58) Field of Classification Search
USPC ......... 370/329, 330, 332, 333, 336, 338, 341, 370/344, 345, 348; 455/450, 451, 452.1, 455/452.2, 453, 456.2, 464, 69
See application file for complete search history.

(56) References Cited

U.S. PATENT DOCUMENTS

| | | | |
|---|---|---|---|
| 7,526,292 B2 | 4/2009 | Kim et al. | |
| 7,738,869 B2 * | 6/2010 | Son et al. | 455/435.1 |
| 7,962,131 B2 * | 6/2011 | Lee et al. | 455/421 |
| 2005/0201295 A1 | 9/2005 | Kim et al. | |
| 2005/0289256 A1 * | 12/2005 | Cudak et al. | 710/62 |
| 2006/0039274 A1 | 2/2006 | Park et al. | |
| 2006/0084453 A1 * | 4/2006 | Kim et al. | 455/517 |
| 2006/0094436 A1 * | 5/2006 | Kim et al. | 455/450 |
| 2006/0148411 A1 * | 7/2006 | Cho et al. | 455/67.13 |
| 2007/0115862 A1 | 5/2007 | Lee et al. | |

FOREIGN PATENT DOCUMENTS

| | | | |
|---|---|---|---|
| KR | 10-2006-0030001 A | 4/2006 | |
| KR | 10-0606083 B1 | 7/2006 | |

* cited by examiner

*Primary Examiner* — Awet Haile
(74) *Attorney, Agent, or Firm* — Birch, Stewart, Kolasch & Birch, LLP

(57) ABSTRACT

A method of switching a radio resource mode allocated to a mobile station in a wireless access system is discussed. The method for switching the radio-resource mode allocated to a mobile station in the wireless access system includes, transmitting a first message comprising Carrier to Interference and Noise Ratio (CINR) information of a second radio-resource mode to a base station for requesting a switching from a first radio-resource mode allocated to the mobile station to the second radio-resource mode; and transmitting a predetermined codeword for indicating that the switching from the first radio-resource mode to the second radio-resource mode has not been normally performed, if a second message approving the switching of the radio-resource mode is not received within a predetermined time.

10 Claims, 8 Drawing Sheets

METHOD OF CONVERTING ALLOCATED RADIO RESOURCE MODE OF MS IN WIRELESS ACCESS SYSTEM

TECHNICAL FIELD

The present invention relates to a wireless access system, and more particularly to a method for switching a radio-resource mode to a mobile station.

BACKGROUND ART

A method for switching a mode of resources allocated from a broadband wireless access system to a mobile station will hereinafter be described in detail. Switching the mode of resources indicates the switching between a normal sub-channel and a band AMC sub-channel. The normal sub-channel may be composed of a distributed sub-carrier permutation, and the band AMC (Adaptation modulation Coding) sub-channel may be composed of an adjacent sub-carrier permutation. The above-mentioned mode switching request operation may use messages or may use channel quality information channel (CQICH) of 6 bits.

FIG. 1 is a flow chart illustrating a general mode switching process from a normal sub-channel to a band AMC sub-channel.

Referring to FIG. 1, a mobile station (MS) may determine to request the switching to the band AMC sub-channel according to communication environments. In this case, the mobile station (MS) transmits an REP-RSP message including measurement values of 4 or 5 bands (hereinafter referred to as the best bands), each of which has a high CINR (Carrier to Interference and Noise Ratio), to a base station (BS) in order to perform the switching from the normal sub-channel to the band AMC sub-channel. In this case, the mobile station (MS) may establish a predetermined band AMC transition delay time, and may transmit the REP-RSP message during the established band AMC transition delay time at step S101.

The mobile station (MS) periodically transmits differential CINRs of best bands to the base station (BS) over the CQICH at step S102.

The base station (BS) having received the REP-RSP message checks the CINRs of the best bands contained in the REP-RSP message, and may approve the MS request of switching to the band AMC mode at step S103.

The base station (BS) transmits a DL-MAP message acting as a control message to the mobile station (MS), such that it informs the MS of band AMC allocation information of an MPDU to be transferred to the mobile station (MS) using the DL-MAP message at step S104.

However, if the mobile station (MS) did not receive the DL-MAP message from the base station (BS) within the band AMC transition delay time (i.e., if the MS was timed out), it recognizes the occurrence of a failure in the switching to the band AMC mode at step S105.

The mobile station (MS) recognizes that the switching to the band AMC mode has failed, such that it transmits a CNIR of a normal sub-channel to the base station (BS) using the latest-received CQICH allocation information element (IE) at step S106.

However, the base station (BS) has been switched to the band AMC mode by a request of the mobile station (MS), such that CQICH information transferred from the mobile station (MS) may be invalid.

If the base station (BS) requests the mode switching to the band AMC sub-channel, it further includes only the above process for transmitting the REP-REQ message to the mobile station (MS) in all the processes of the MS which requests the mode switching. So, all the BS processes except for the above transmission of the REP-REQ message are equal to those of the mobile station (MS).

FIG. 2 is a flow chart illustrating a general mode switching process from the band AMC sub-channel to the normal sub-channel.

Referring to FIG. 2, the mobile station (MS) may request the switching from the band AMC channel to the normal sub-channel according to communication environments. Therefore, the mobile station (MS) transmits the REP-RSP message including the CINR of the normal sub-channel to the base station (BS) at step S201.

In this case, the mobile station (MS) may transmit differential CINRs of the best bands to the base station (BS) over the CQICH at step S202.

The base station (BS) having received the REP-RSP message checks the CINR of the normal sub-channel contained in the REP-RSP message, and then approves the MS request of switching to the normal AMC mode at step S203.

In this case, the base station (BS) transmits the UL-MAP message acting as a control message, which includes a CQICH allocation IE indicating the switching to the normal sub-channel, to the mobile station (MS) at step S204.

However, if the mobile station (MS) did not receive the UL-MAP message from the base station (BS) at step S204, it recognizes the occurrence of a failure in the switching to the normal mode at step S205.

Although the base station (BS) has informed the mobile station (MS) of allocation information of a normal channel of the MPDU to be transferred to the mobile station (MS) using the DL-MAP message at step S206, the mobile station (MS) transmits differential CINRs of the best bands over the CQICH of the prior band AMC at step S207. However, the base station (BS) has been switched to the normal sub-channel mode by a request of the mobile station (MS), such that CQICH information transferred from the mobile station (MS) may be invalid.

In other words, FIGS. 1 and 2 assumes that the mobile station (MS) does not receive an MAP IE message although the base station (BS) has approved the mode switching using the MAP IE message acting as the control message. If the mobile station (MS) did not receive the MAP IE message acting as the control message, the mobile station (MS) and the base station (BS) are operated in different modes, such that unexpected problems may occur.

DISCLOSURE

Technical Problem

Accordingly, the present invention is directed to a method of switching a radio-resource mode allocated to a mobile station (MS) in a wireless access system that substantially obviates one or more problems due to limitations and disadvantages of the related art.

An object of the present invention is to provide an effective communication method.

Another object of the present invention is to provide a method for switching a mode of radio resources allocated between the base station (BS) and the mobile station (MS).

Yet another object of the present invention is to provide a method for solving the problems generated when the mobile station (MS) does not receive control messages from the base station (BS), during the switching time in which the mobile station (MS) switches the mode of radio resources.

Yet another object of the present invention is to provide a wireless access system, and a method for switching a mode of radio resources allocated to the mobile station (MS) in the wireless access system.

Technical Solution

To achieve these objects and other advantages and in accordance with the purpose of the invention, as embodied and broadly described herein, a method for switching a radio-resource mode allocated to a mobile station in a wireless access system includes: transmitting information of a second radio-resource mode to a base station, and requesting a switching from a first radio-resource mode allocated to the mobile station to the second radio-resource mode; and re-requesting the switching of the radio-resource mode using a high-speed feedback channel, if a message approving the switching of the radio-resource mode is not received within a predetermined time.

The information of the second radio resource mode may include Carrier to Interference and Noise Ratio (CINR) information. The high-speed feedback channel may be a channel quality information channel (CQICH). The first radio-resource mode may be a normal sub-channel, and the second radio-resource mode may be a band AMC sub-channel.

In another aspect of the present invention, there is provided a method for switching a first radio-resource mode allocated to a mobile station to a second radio-resource mode in a wireless access system, the method including: receiving information of the second radio resource mode from the mobile station; allocating the second radio resource mode to the mobile station, and transmitting a message approving the switching from the first radio-resource mode to the second radio-resource mode to the mobile station; and upon receiving a predetermined codeword from the mobile station (MS) over a high-speed feedback channel, recognizing that the approving message has not been normally transmitted to the mobile station, re-allocating the second radio resource mode to the mobile station, and retransmitting a message approving the switching to the second radio-resource mode to the mobile station.

The method may further include, before receiving the information of the second radio resource mode, transmitting a specific message to the mobile station, wherein the specific message is used to request a switching from the first radio-resource mode to another radio-resource mode.

The information of the second radio resource mode may be Carrier to Interference and Noise Ratio (CINR) information. The high-speed feedback channel may be a channel quality information channel (CQICH).

It is to be understood that both the foregoing general description and the following detailed description of the present invention are exemplary and explanatory and are intended to provide further explanation of the invention as claimed.

Advantageous Effects

The present invention has the following effects.

If the mobile station (MS) performs the switching between the normal mode and the band AMC mode, the present invention provides not only a method for allowing the base station (BS) to explicitly transmit a response to the resource-mode switching request, but also a method for allowing the base station (BS) to re-request the mode switching using a codeword on the condition that the mobile station (MS) did not receive the above response. Therefore, the present invention can solve problems caused by inconsistent operation modes between the mobile station (MS) and the base station (BS) when the mobile station (MS) does not receive the control message.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
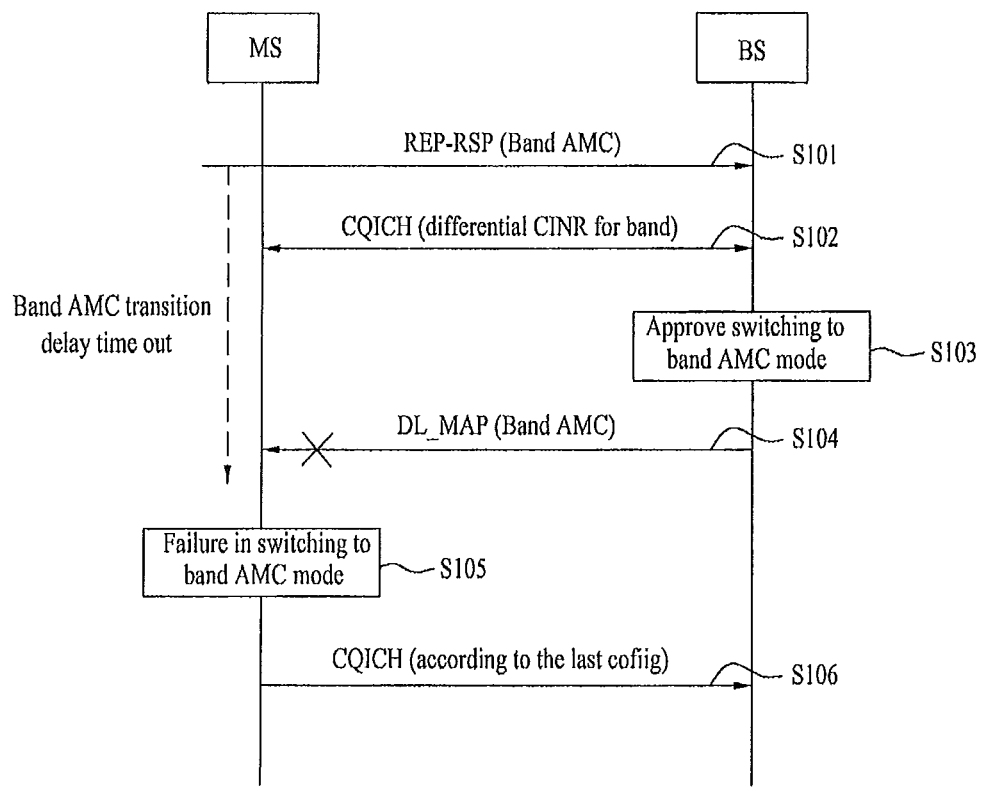
FIG. 1 is a flow chart illustrating a general mode switching process from a normal sub-channel to a band AMC sub-channel.
Figure 2:
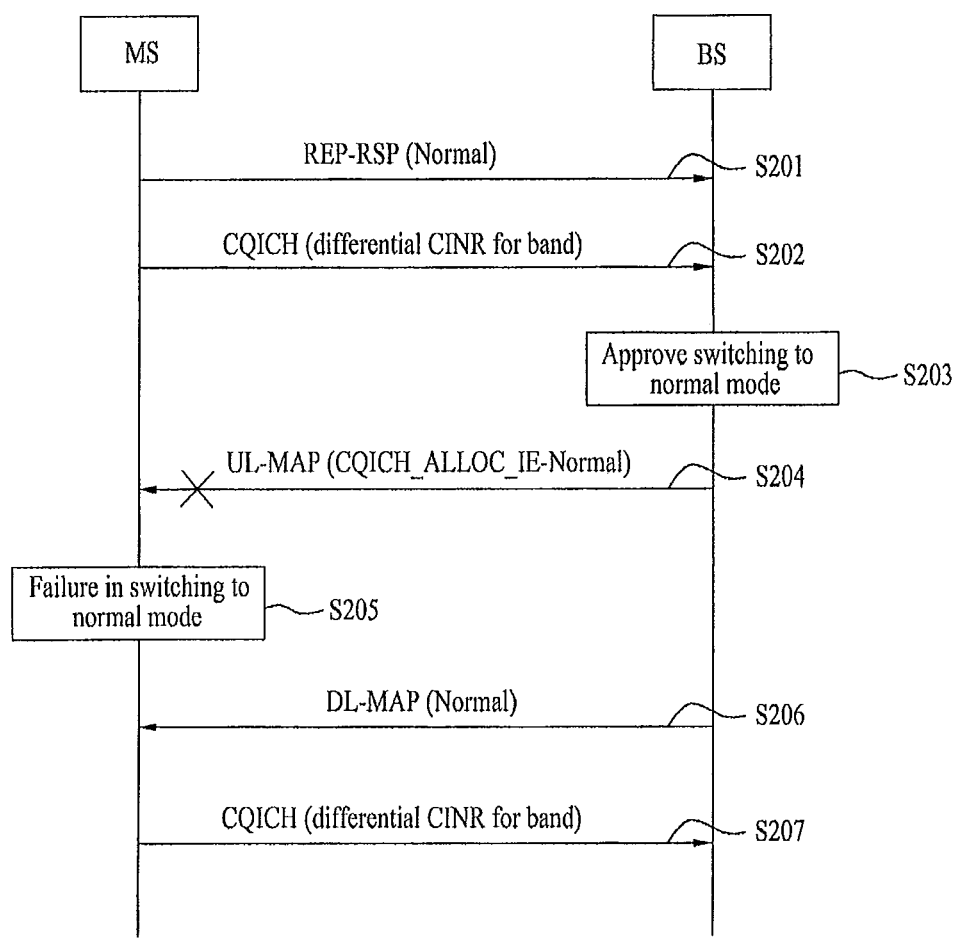
FIG. 2 is a flow chart illustrating a general mode switching process from the band AMC sub-channel to the normal sub-channel.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that the present invention relates to a wireless access system, and more particularly to a method for switching a mode of radio resources allocated to the mobile station (MS). In other words, embodiments of the present invention may request the switching of a report mode of the CQICH, may receive resources of a desired mode to answer the CQICH report mode, and may receive a method for receiving the UL-MAP or REP-REQ message approving the report mode switching.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The following embodiments of the present invention may be supported by standard documents disclosed in at least one of various wireless access systems, for example, the IEEE 802 system, the 3GPP system, the 3GPP LTE system, and the GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents. Specifically, the embodiments of the present invention may be supported by at least one of standard documents (i.e., P802.16-2004, P802.16e-2005, and P802.16Rev2/D4 (April 2008)) of the IEEE 802.16 system.

Prior to describing the present invention, it should be noted that specific terms disclosed in the present invention are proposed for the convenience of description and better understanding of the present invention, and the use of these specific terms may be changed to another format within the technical scope or spirit of the present invention.

The above-mentioned embodiments of the present invention are disclosed on the basis of a data communication relationship between the base station (or Node-B or eNode-B) and the mobile station (MS). In this case, the base station is used as a terminal node of a network via which the base station can directly communicate with the mobile station (MS). Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station (MS)" may also be replaced with a user terminal, a user equipment (UE), a mobile station (MS) or a mobile subscriber station (MSS) as necessary.

The following embodiments of the present invention can be implemented by hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, or a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Next, a method for switching a mode of radio resources allocated to the mobile station (MS) will hereinafter be described in detail.

1. Mode Switching Method from Normal Sub-Channel to Band AMC Sub-Channel

1) Method of Using Messages

The switching of the radio-resource mode may be requested by a mobile station (MS) or a base station (BS). The mobile station (MS) includes measurement values of 4 or 5 best bands each having the high CINR in the REP-RSP message, and transmits the REP-RSP message including the measurement values to the base station (BS), such that it may request the switching to the band AMC sub-channel.

After requesting the mode switching, the mobile station (MS) may transmit differential CINRs of the best bands to the base station (BS) over the CQICH, irrespective of the currently-established parameter. If the mobile station (MS) does not receive either the REP-REQ message or the DL-MAP message from the base station (BS) within a band AMC transition delay time (i.e., CQICH band AMC transition delay), it may determine a failure of the mode switching request. In this case, the REP-REQ message is used to request transmission of the CINR of the band AMC, and the DL-MAP message is used to allocate the band AMC sub-channel to the mobile station (MS). If the mode switching request has failed, the mobile station (MS) may transmit the CINR according to parameters established in the CQICH before requesting the mode switching.

Also, the base station (BS) transmits the REP-REQ message requesting transmission of the CINR of the band AMC to the mobile station (MS), such that it may request the switching to the band AMC sub-channel. Thereafter, other operations following the above operation are equal to those of the MS which outputs the switching request.

2) Method of Using 6-Bit CQICH

The mobile station (MS) may request the switching from the normal sub-channel to the band AMC sub-channel using the CQICH of 6 bits. The mobile station (MS) transmits a CQICH codeword (C1) to the base station (BS), such that it may request the switching from the normal sub-channel to the band AMC sub-channel. The base station (BS) having received the CI may transmit the REP-REQ message requesting a CINR measurement value of the band AMC to the mobile station (MS). The mobile station (MS) having received the REP-REQ message transmits a codeword C2 to the base station (BS). Thereafter, other operations following the above operation are equal to those of the MS which performs the mode switching using messages.

The base station (BS) transmits the REP-REQ message requesting the transmission of the CINR of the band AMC to the mobile station (MS), such that it may request the switching to the band AMC sub-channel. The mobile station (MS) having received the REP-REQ message transmits the C2 to the base station (BS). Thereafter, other operations following the above operation are equal to those of the MS which performs the mode switching using the messages.

2. Mode Switching Method from Band AMC Sub-Channel to Normal Sub-Channel

1) Mode Switching Method Based on Messages

The mode switching from the band AMC sub-channel to the normal sub-channel may be requested by a mobile station (MS) or a base station (BS). The mobile station (MS) includes the CINR of the normal sub-channel in the REP-RSP message, and transmits the REP-RSP message to the base station (BS), such that it may request the switching from the band AMC sub-channel to the normal sub-channel.

If the mobile station (MS) does not receive the UL-MAP message acting as a control message including the CQICH allocation IE indicating the switching to the normal sub-channel from the base station (BS), it may determine a failure of the mode switching request. If the mode switching request has failed, the mobile station (MS) may continuously transmit the band AMC's differential CINR which has been transferred over the CQICH.

The base station (BS) transmits the UL_MAP message including CQICH allocation information indicating the switching to the normal sub-channel to the mobile station (MS), such that it may command the mobile station (MS) to be switched to the normal sub-channel.

2) Mode Switching Method of Using 6-Bit CQICH

The mobile station (MS) transmits a CQICH codeword 'C3' to the base station (BS), such that it may request the switching to the normal sub-channel from the base station (BS). After requesting the mode performing, the mobile station (MS) may transmit a CINR of an overall band to the base station (BS) over the CQICH until reaching a specific time at which the base station (BS) allocates the normal sub-channel.

According to system requirements, the mobile station (MS) or the base station (BS) may request the switching of radio-resource mode in order to switch the radio-resource mode to another mode. In this case, the base station (BS) may transmit an MAP IE or a channel measurement report message (hereinafter referred to as an REP message) in order to switch the mode of radio resources to another mode. The REP message may include information indicating an approval or denial of the mode switching. If the mobile station (MS) does not receive the corresponding message, it may re-attempt to request the mode switching using a codeword of the 6-bit CQICH.

According to one embodiment of the present invention, if the mobile station (MS) requests the mode switching from the band AMC sub-channel to the normal sub-channel, a parameter associated with the MS waiting time during which the MS waits for the response to the switching request must be additionally transmitted to the mobile station (MS) over a UCD. Also, although either the mobile station (MS) currently in the band AMC mode or the other mobile station requesting the switching to the normal mode receives specific information, indicating that the MPDU to be transferred to the MS or the other MS is transferred to the normal sub-channel, via the DL_MAP message, it may recognize the mode switching approval in the same manner as in the UL_MAP message.

According to one embodiment of the present invention, if the base station (BS) requests the mode switching from the band AMC sub-channel to the normal sub-channel, it may use different messages according to the presence or absence of downlink data to be transferred to the MS. In case of the downlink data is presence, the base station (BS) may command the mode switching using the UL_MAP message, and in case of the downlink data is absence, the base station (BS) may command the mode switching using the REP-REQ.

The following Table 1 shows exemplary UCD parameters which are used to request the switching to the normal mode.

TABLE 1

| Name | Type (1 byte) | Length | Value |
|---|---|---|---|
| CQICH Normal Transition Delay | 214 | 1 | Frame unit. |

Embodiments of the present invention will hereinafter be described with reference to the annexed drawings.

Figure 3:
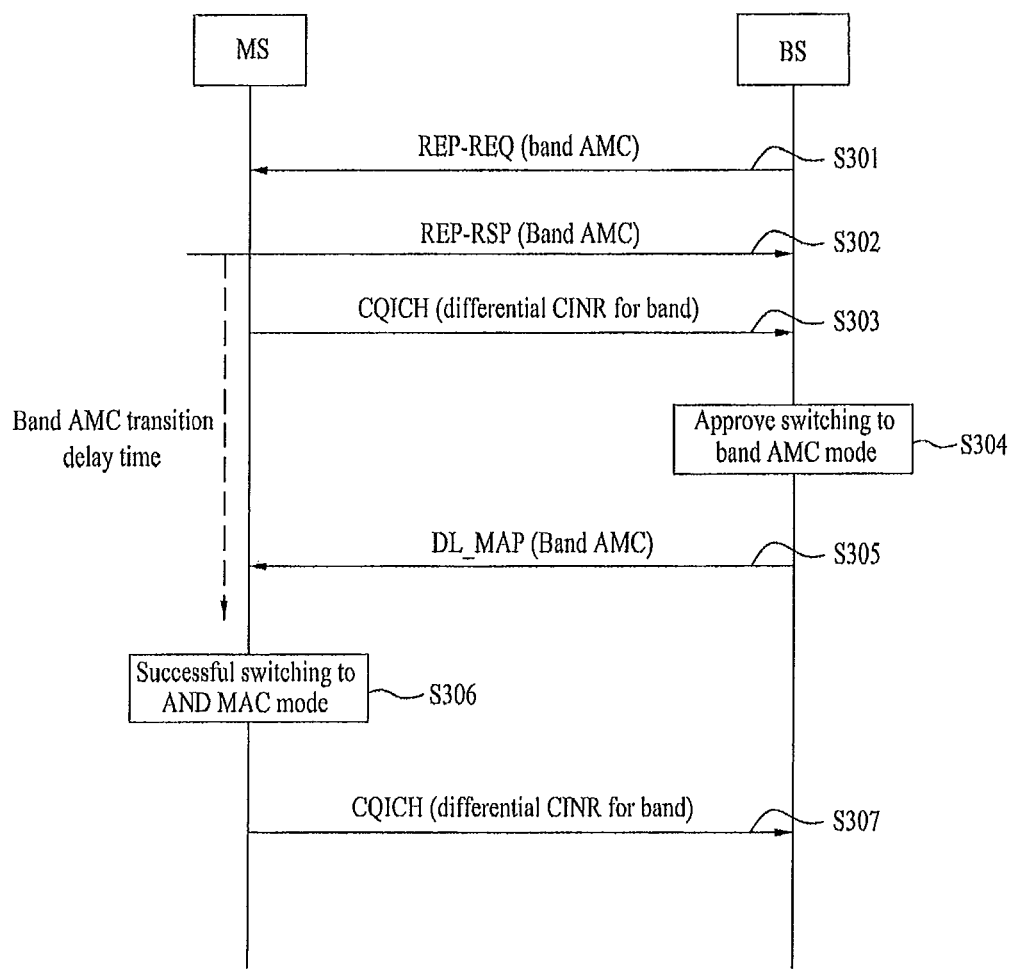
FIG. 3 is a flow chart illustrating a method for enabling the base station (BS) to request the switching to the band AMC sub-channel using an REP-REQ message, and operations generated when this mode switching is successfully carried out according to the present invention.

FIG. 3 is a flow chart illustrating a method for enabling the base station (BS) to request the switching to the band AMC sub-channel using the REP-REQ message, and operations generated when this mode switching is successfully carried out according to the present invention.

Referring to FIG. 3, the base station (BS) decides to request the mode switching to the band AMC sub-channel, and transmits the REP-REQ message to request the CINR report of the best band of the AMC band at step S301.

The mobile station (MS) having received the REP-REQ message transmits the REP-RSP message including the CINR of the best band to the base station (BS) at step S302. Thereafter, the mobile station (MS) periodically transmits the differential CINRs of the best bands to the base station (BS) over the CQICH at step S303. In this case, after the mobile station (MS) transmits the REP-RSP message to the base station (BS), a timer of the band AMC transmission time is set up.

The base station (BS) having received the REP-RSP message checks the best band's CINR contained in the REP-RSP message, and may approve the switching request to the most appropriate band AMC mode at step S304.

The base station (BS) informs the mobile station (MS) of the band AMC allocation information of the MPDU to be transferred to the MS using the DL_MAP message at step S305. The DL_MAP message is one of control messages. If the mobile station (MS) receives the DL_MAP message from the base station (BS) within the timer time established by the MS at step S302, it may recognize the success of mode switching at step S306.

The mobile station (MS) may transmit differential CINRs of the best bands to the base station (BS) over the CQICH at step at step S307.

Figure 4:
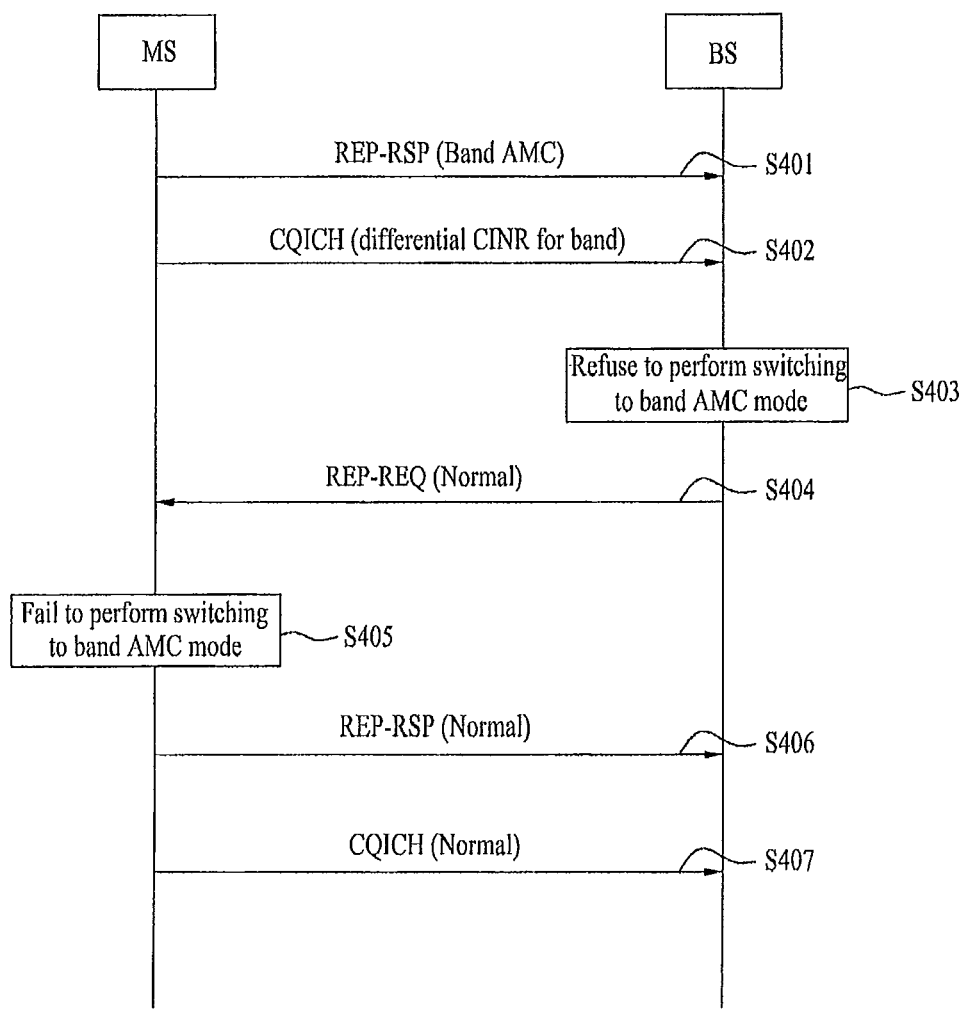
FIG. 4 is a flow chart illustrating a method for enabling the mobile station (MS) to request the switching to the band AMC sub-channel using an REP-RSP message according to the present invention.

FIG. 4 is a flow chart illustrating a method for enabling the mobile station (MS) to request the switching to the band AMC sub-channel using the REP-RSP message according to the present invention.

Referring to FIG. 4, the mobile station (MS) decides to request the mode switching from the normal sub-channel to the band AMC sub-channel according to communication environments, and transmits the REP-RSP message including the best-band CINR of the band AMC sub-channel to the base station (BS) at step S401.

The mobile station (MS) periodically transmits differential CINRs of the best bands, which have been transmitted at the above step S401, to the base station (BS) using the CQICH at step S402.

In case of no band AMC allocation resources or resource status information, the base station (BS) having received the REP-RSP message may refuse the request of the mode switching to the band AMC mode at step S403.

Therefore, the base station (BS) transmits the REP-REQ message including report request information of the CINR of the normal sub-channel to the mobile station (MS) at step S404.

The mobile station (MS) having received the REP-REQ message may be able to recognize the failure of mode switching request at step S405.

Therefore, the mobile station (MS) transmits the REP-RSP message including the CINR of the normal sub-channel to the base station (BS) at step S406.

Also, the mobile station (MS) transmits CINR information of the normal sub-channel over the CQICH at step S407, instead of transmitting the differential CINRs of the best bands.

Figure 5:
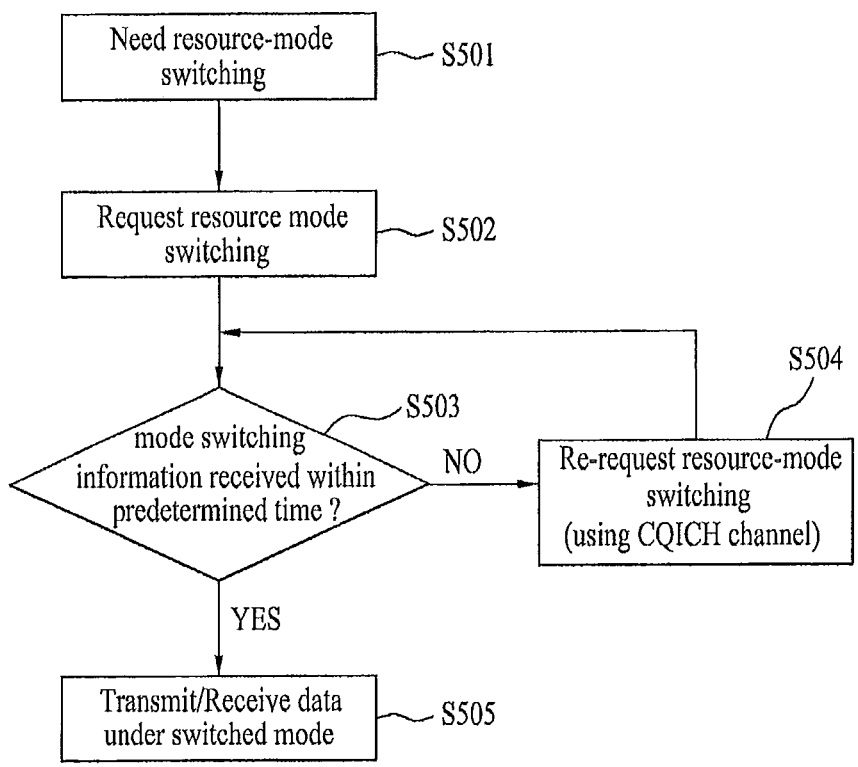
FIG. 5 is a flow chart illustrating a method for switching a resource mode according to one embodiment of the present invention.

FIG. 5 is a flow chart illustrating a method for switching a resource mode according to one embodiment of the present invention.

Referring to FIG. 5, a mode of resources allocated to the current MS may be switched to another so as to provide a better quality service at step S501. Also, the above-mentioned mode may also be switched to another due to a poor communication environment at step S501.

Therefore, the mobile station (MS) or the base station (BS) may request the switching of resource mode at step S502. In this case, the subject requesting the resource-mode switching may be differently determined according to system requirements.

If the mobile station (MS) requests the switching of the resource mode from the base station (BS), it may establish the timer for receiving the mode switching information during a predetermined time at step S503. This predetermined time may be differently determined according to system requirements.

The mode switching information may be contained in the UL-MAP or REP-REQ message approving the mode switching. Also, the mode switching information may include resources of the mode allocated to the mobile station (MS). In other words, the mobile station (MS) receives resource of the switched mode from the base station (BS), such that it is able to recognize the success of the mode switching.

If the base station (BS) receives the resource-mode switching request from the mobile station (MS), it is able to check measurement values (e.g., CINR of the best band) transferred along with the request message. Thus, the base station (BS) may transmit information of the best resource mode to the mobile station (MS).

If the mobile station (MS) receives information of the switched resource mode from the base station (BS) during the timer time at step S503, it may transmit and receive data under the switched resource mode at step S505.

However, if the timer has expired (i.e., if the timer is timed out) at step S503, the mobile station (MS) may re-request the switching of the resource mode from the base station (BS). If the mobile station (MS) does not receive information of the switched resource mode from the base station (BS) until reaching the expiration of the timer, resource-mode information recognized by the mobile station (MS) is different from that of the base station (BS), such that transmission and reception of data cannot be normally carried out. In this case, if the mobile station (MS) re-requests the switching of the resource mode, it may use a high-speed feedback channel. Specifically, embodiments of the present invention may use the CQICH to transmit reliable data at step S504.

If the mobile station (MS) recognizes that the resource-mode switching has failed, it may directly re-request the switching of the resource mode from the base station (BS) over the CQICH. So, the base station (BS) can provide a rapid user service.

Figure 6:
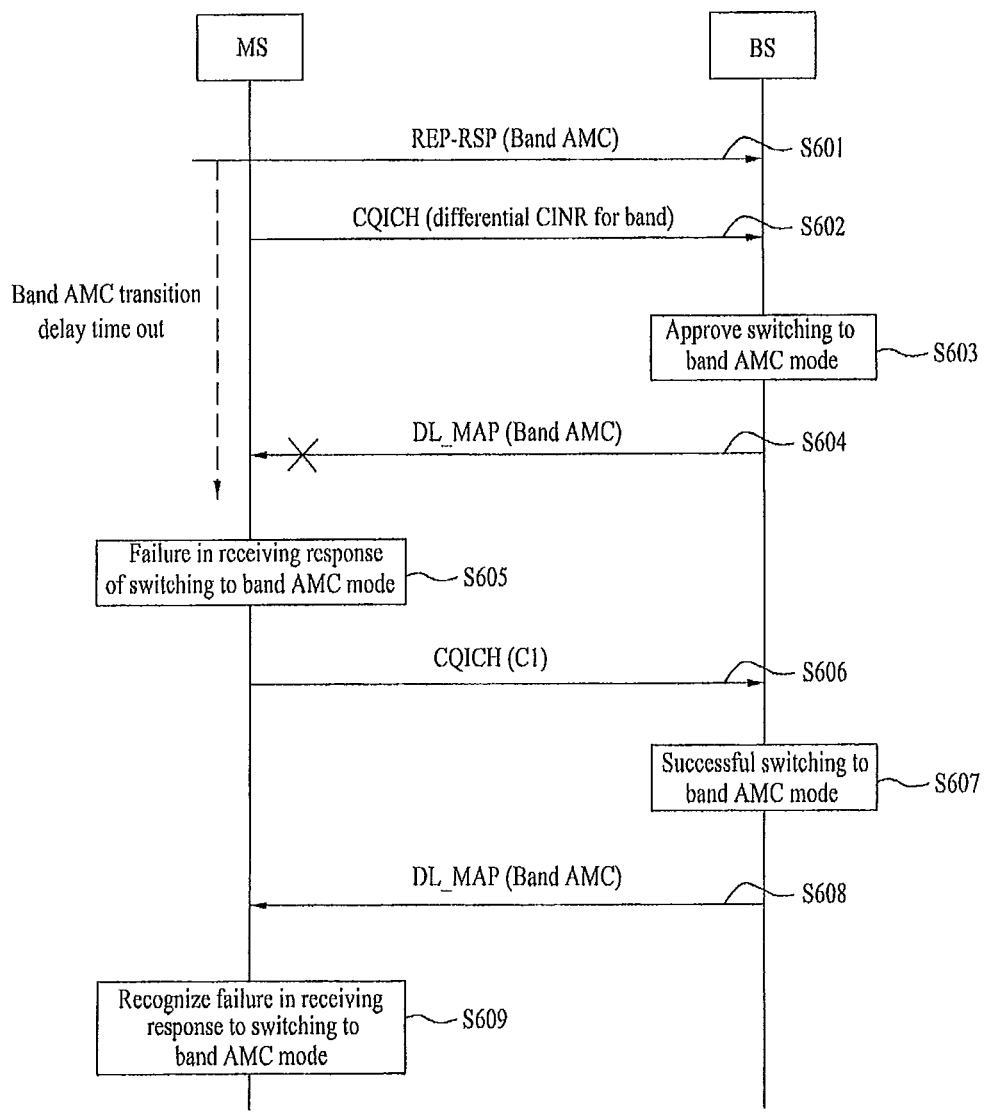
FIG. 6 is a flow chart illustrating a method for allowing the mobile station (MS) to re-switch the normal sub-channel to the band AMC sub-channel using a codeword according to one embodiment of the present invention.

FIG. 6 is a flow chart illustrating a method for allowing the mobile station (MS) to re-switch the normal sub-channel to the band AMC sub-channel using a codeword according to one embodiment of the present invention.

Referring to FIG. 6, due to communication environments or other factors, the mode switching from the normal sub-channel to the band AMC sub-channel may be requested. For this operation, the mobile station (MS) transmits the REP-RSP message including a CINR measurement value of the best band of the band AMC sub-channel to the base station (BS) at step S601.

The mobile station (MS) may periodically transmit differential CINRs of the best bands to the base station (BS) over the CQICH at step S602.

The base station (BS) having received the REP-RSP message checks the CINR of best band measurement value contained in the REP-RSP message, and approves the request of the switching to the band AMC mode at step S603.

The base station (BS) informs the mobile station (MS) of the band AMC allocation information of the MPDU to be transferred to the mobile station (MS) using the DL_MAP message at step S604.

However, if the mobile station (MS) does not receive this DL_MAP message within the band AMC transition delay time, it determines that the mode switching response has not been received due to wireless environments, such that it may recognize the failure of the switching to the band AMC mode at step S605.

Therefore, after the above-mentioned band AMC transition delay time has expired (i.e., has timed out), the mobile station (MS) transmits a CQICH codeword 'C1' to the base station (BS) over the CQICH, such that it may re-request the mode switching to the band AMC sub-channel from the base station (BS) at step S606.

If the base station (BS) switched to the band AMC mode receives the C1 message, the base station (BS) may recognize that the mobile station (MS) has not received the DL_MAP message approving the mode switching at step S607.

Therefore, the base station (BS) transmits the DL_MAP message to the mobile station (MS) in order to re-transmit prior data which has been transmitted via the band AMC at step S608.

The mobile station (MS) having received the DL_MAP message from the base station (BS) finishes switching to the band AMC mode at step S609.

By the steps of FIG. 6, although the mobile station (MS) fails to request the resource-mode switching, it may immediately re-request the resource-mode switching from the base station (BS), such that various problems caused when the mobile station (MS) does not receive a control message associated with the mode switching can be solved.

Figure 7:
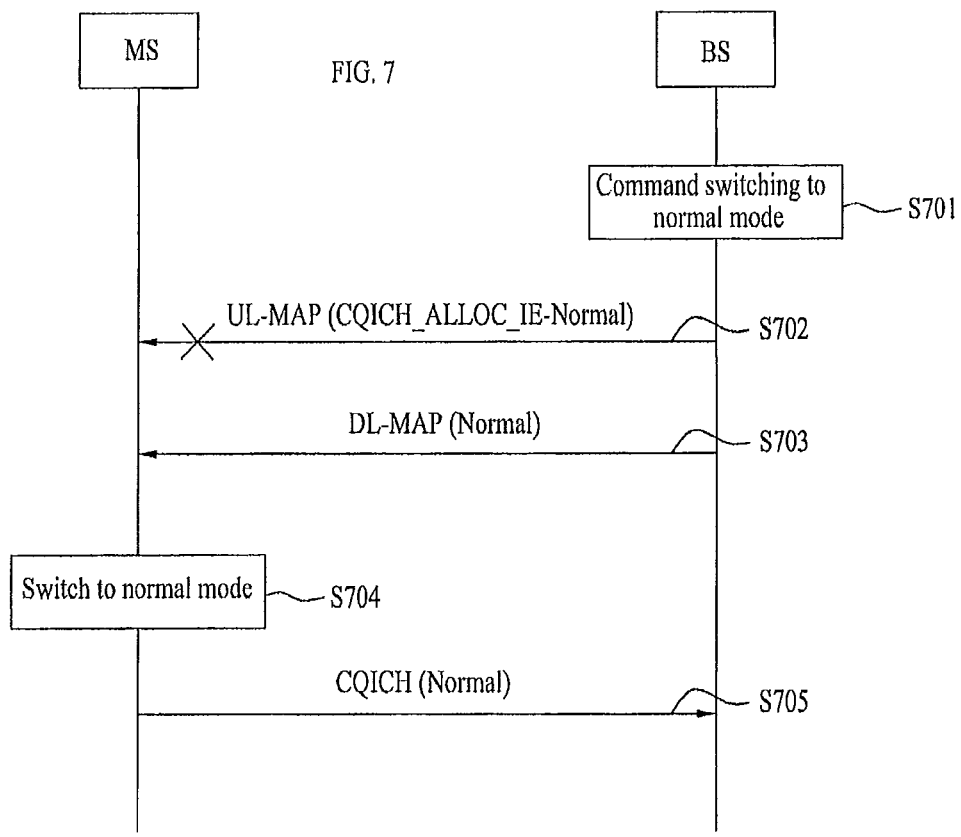
FIG. 7 is a flow chart illustrating a mode switching process from the band AMC sub-channel to the normal sub-channel according to the present invention.

FIG. 7 is a flow chart illustrating a mode switching process from the band AMC sub-channel to the normal sub-channel according to the present invention.

FIG. 7 shows a method for commanding the mobile station (MS) to be switched from the band AMC sub-channel to the normal sub-channel by the base station (BS). In this case, the base station (BS) may perform the mode switching using the UL_MAP or DL_MAP message.

Referring to FIG. 7, the base station (BS) commands the mobile station (MS) to perform the mode switching to the normal sub-channel at step S701.

The base station (BS) transmits the UL_MAP message including the CQICH allocation IE, which indicates the resource-mode switching to the normal sub-channel, to the normal sub-channel at step S702.

However, the mobile station (MS) may not normally receive the UL_MAP message from the base station (BS). In this case, the mobile station (MS) does not perform the operations associated with the mode switching.

Therefore, the base station (BS) may transmits the DL_MAP message to the mobile station (MS), such that it may re-inform the mobile station (MS) of allocation information of the normal sub-channel associated with the MPDU to be transmitted to the MS at step S703.

If the mobile station (MS) receives the DL_MAP message including the allocation information of the normal sub-channel at step S703, it switches the allocated resource mode from the band AMC sub-channel to the normal sub-channel at step S704.

The mobile station (MS) having performed the resource-mode switching may transmit a CINR measurement value of the normal sub-channel to the base station (BS) over the CQICH at step S705.

Figure 8:
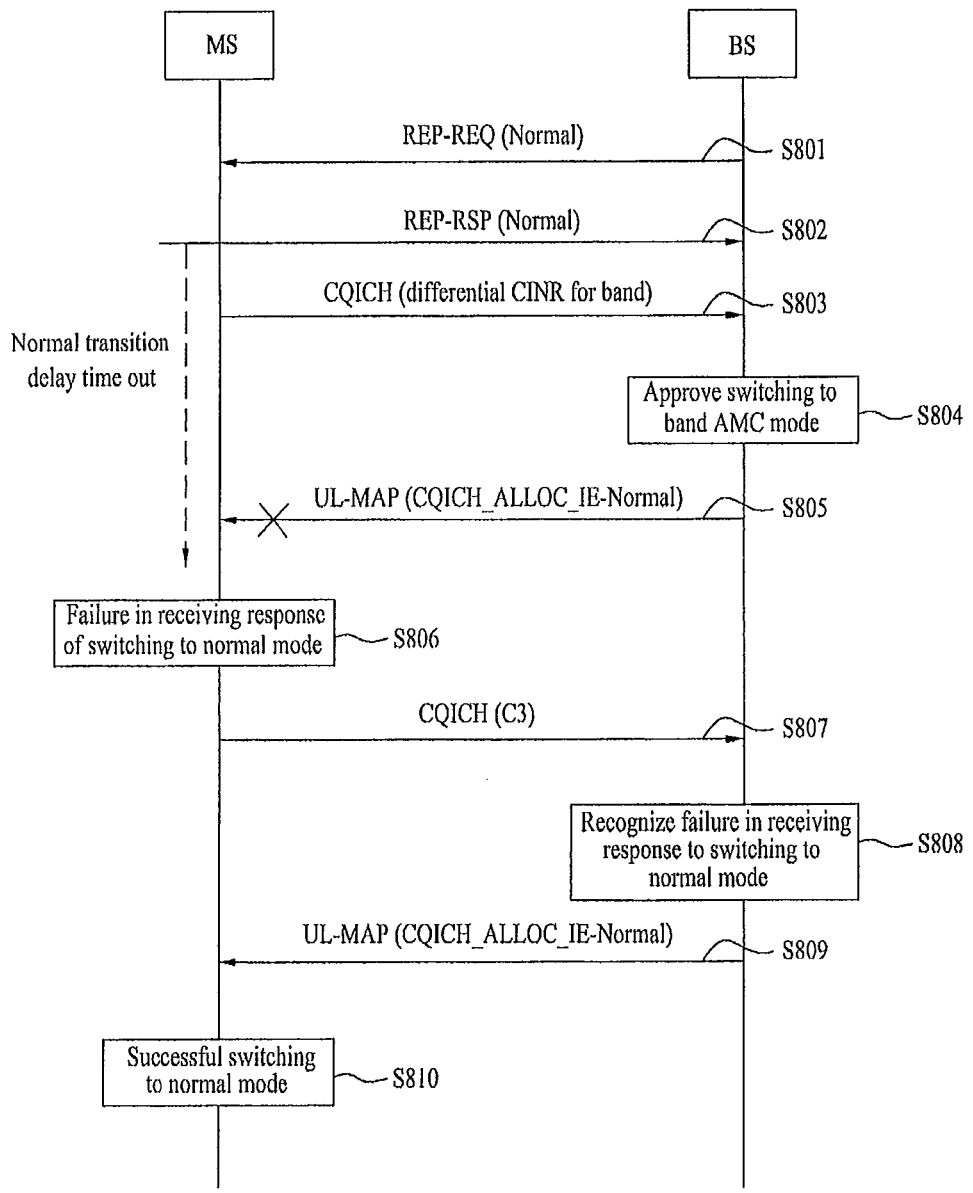
FIG. 8 is a flow chart illustrating a method for re-requesting the switching to the normal sub-channel using the codeword according to one embodiment of the present invention.

FIG. 8 is a flow chart illustrating a method for re-requesting the switching to the normal sub-channel using the codeword according to one embodiment of the present invention.

In FIG. 8, if the base station (BS) has no data to be transferred to the mobile station (MS), it requests the mode switching to the normal sub-channel using the REP-REQ message. Thereafter, if a response to the mode switching request is not received from the base station (BS), the request of the mode switching from the mobile station (MS) to the base station (BS) may be re-attempted.

Referring to FIG. 8, the base station (BS) decides to request the mode switching from the band AMC sub-channel to the normal sub-channel, and transmits the REP-REQ message to the mobile station (MS) so as to request the report of CINR measurement values of the normal sub-channel at step S801.

The mobile station (MS) having received the REP-REQ message transmits the REP-RSP message including CINR measurement values of the best bands of the normal sub-channel to the base station (BS) at step S802. After the mobile station (MS) transmits the REP-RSP message to the base station (BS) at step S802, it may establish the timer associated with the normal transition delay time.

In this case, since the resource mode has not yet been switched to another, the mobile station (MS) periodically transmits the CINR measurement values of the best bands of the band AMC sub-channel to the base station (BS) over the CQICH in the same manner as in the other case made before the mobile station (MS) generates the switching request at step S803.

The base station (BS) having received the REP-RSP message checks the CINR measurement value of the best band of the normal sub-channel contained in the REP-RSP message, and may approve a request of the switching to the appropriate normal sub-channel mode at step S804. At step S804, the base station (BS) performs the mode switching to the normal sub-channel.

The base station (BS) may transmit a control message (e.g., UL_MAP) to the mobile station (MS) at step S805. In this case, the control message includes the CQICH allocation IE indicating the switching to the most appropriate normal sub-channel.

However, if the mobile station (MS) does not normally receive the UL_MAP message within a normal transition delay time, it determines that the mode-switching response has not been received due to wireless environments, such that it may recognize the failure of the switching to the band AMC mode at step S806.

In this case, the mobile station (MS) transmits the CQICH codeword 'C3' to the base station (BS), such that it may re-request the switching to the normal sub-channel at step S807.

If the base station (BS) currently switched to the normal sub-channel mode receives the C3 message, the base station (BS) may recognize that the mobile station (MS) has not received the UL_MAP message approving the mode switching at step S808.

Therefore, the base station (BS) transmits the UL_MAP message including CQICH_ALLOC_IE associated with the normal sub-channel to the mobile station (MS) at step S809, such that it may re-allocate the resource mode.

The mobile station (MS) having received the UL_MAP message from the base station (BS) may complete the switching to the normal mode at step S810.

By the above-mentioned steps, although the mobile station (MS) does not normally receive the control message including resource-mode allocation information from the base station (BS), the mobile station (MS) requests re-allocation of the resource mode using the CQICH, such that it may solve the problems caused when the mobile station (MS) and the base station (BS) recognize different transmission areas.

The above embodiments are proposed by combining constituent components and characteristics of the present invention according to a predetermined format. If required, individual constituent components or characteristics may be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope and spirit of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied a variety wireless communication systems, for example, a 3rd Generation Partnership Project (3GPP), a 3GPP2, and/or an IEEE 802.xx (Institute of Electrical and Electronic Engineers 802) system. Specifically, the above-mentioned embodiments may also be applied to various methods for switching the radio-resource mode allocated to the mobile station (MS) in such wireless communication systems.

The invention claimed is:

1. A method for allocating a radio-resource mode to a mobile station in a wireless access system, the method performed by the mobile station, the method comprising:
transmitting a first message for requesting a mode switching from a first radio-resource mode allocated to the mobile station to a second radio-resource mode, the first message including Carrier to Interference and Noise Ratio (CINR) information of the second radio-resource mode; and
transmitting a third message through a high-speed feedback channel when a second message approving the mode switching is not received within a predetermined time;
wherein the third message indicating that the mode switching has not been normally performed;
wherein the second message is a MAP control message including channel quality information channel (CQICH) allocation information when downlink data is present and a REP-REQ (response-request) message requesting the CINR information when the downlink data is absent.

2. The method according to claim 1, wherein the high-speed feedback channel is a channel quality information channel (CQICH).

3. The method according to claim 1, wherein the first radio-resource mode is a normal sub-channel, and the second radio-resource mode is a band adaptive modulation coding (AMC) sub-channel.

4. The method according to claim 1, wherein the third message is a predetermined codeword.

5. The method according to claim 1, wherein the first radio-resource mode is a band AMC sub-channel, and the second radio-resource mode is a normal sub-channel.

6. A method for allocating a radio-resource mode to a mobile station in a wireless access system, the method performed by a base station, the method comprising:

receiving a first message requesting a mode switching from a first radio-resource mode allocated to the mobile station to a second radio-resource mode, the first message including Carrier to Interference and Noise Ratio (CINR) information of the second radio-resource mode;

allocating the second radio resource mode to the mobile station;

transmitting a second message approving the mode switching to the mobile station; and retransmitting the second message when a third message is received through a high-speed feedback channel from the mobile station, the third message indicating that the mode switching has not been normally performed;

wherein the second message is selected between a MAP control message and the REP-REQ message based on whether downlink data is present or not.

7. The method according to claim 6, wherein the third message is a predetermined codeword.

8. The method according to claim 6, wherein the high-speed feedback channel is a channel quality information channel (CQICH).

9. The method according to claim 6, wherein the first radio-resource mode is a normal sub-channel, and the second radio-resource mode is a band adaptive modulation coding (AMC) sub-channel.

10. The method according to claim 6, wherein the first radio-resource mode is a band AMC sub-channel, and the second radio-resource mode is a normal sub-channel.

\* \* \* \* \*